(12) United States Patent
Saxena et al.

(10) Patent No.: US 12,000,965 B2
(45) Date of Patent: Jun. 4, 2024

(54) CREATING MULTI-RETURN MAP DATA FROM SINGLE RETURN LIDAR DATA

(71) Applicant: HERE Global B.V., Eindhoven (NL)

(72) Inventors: Deekshant Saxena, Mumbai (IN); Senjuti Sen, Manpada (IN)

(73) Assignee: HERE Global B.V., Eindhoven (NL)

( * ) Notice: Subject to any disclaimer, the term of this patent is extended or adjusted under 35 U.S.C. 154(b) by 418 days.

(21) Appl. No.: 17/497,314

(22) Filed: Oct. 8, 2021

(65) Prior Publication Data

US 2023/0113286 A1    Apr. 13, 2023

(51) Int. Cl.
| | |
|---|---|
| G01S 7/497 | (2006.01) |
| G01S 17/89 | (2020.01) |
| G01S 17/931 | (2020.01) |
| G06F 16/29 | (2019.01) |
| G06N 3/02 | (2006.01) |

(52) U.S. Cl.
CPC .............. *G01S 7/497* (2013.01); *G01S 17/89* (2013.01); *G01S 17/931* (2020.01); *G06N 3/02* (2013.01); *G06F 16/29* (2019.01)

(58) Field of Classification Search
None
See application file for complete search history.

(56) References Cited

U.S. PATENT DOCUMENTS

| | | | |
|---|---|---|---|
| 9,684,066 B2 | 6/2017 | Bartolome et al. | |
| 2019/0049970 A1 | 2/2019 | Djuric et al. | |
| 2020/0166616 A1 | 5/2020 | East-lavoie et al. | |
| 2020/0309957 A1* | 10/2020 | Bhaskaran | G01S 17/86 |

OTHER PUBLICATIONS

Bellakaout, A. & Cherkaoui, M. & Mohamed, Ettarid & Touzani, A.. (Jun. 2016). Automatic 3D Extraction of Buildings, Vegetation and Roads from LIDAR Data. ISPRS—International Archives of the Photogrammetry, Remote Sensing and Spatial Information Sciences. XLI-B3. 173-180. 10.5194/isprs-archives-XLI-B3-173-2016. (pp. 1-9).

* cited by examiner

*Primary Examiner* — Raul J Rios Russo
*Assistant Examiner* — Carl F. R. Tchatchouang
(74) *Attorney, Agent, or Firm* — Lempia Summerfield Katz LLC

(57) ABSTRACT

System and methods for creating multi-return map data using single return Lidar data. The systems and methods use a long short-term memory (LSTM) model in combination with a Generative Adversarial Network (GAN) model. The systems and method use a single (1st) return of Lidar at a time stamp and create multiple unseen samples of 2nd and 3rd returns. The LSTM model is used to create a sequential calibration based on incidence angle to choose the optimized 2nd and 3rd return at the same instance of the time stamp. This creates a localized model of three returns from a single return of Lidar and thus provides additional data to generate an HD map.

20 Claims, 14 Drawing Sheets

CREATING MULTI-RETURN MAP DATA FROM SINGLE RETURN LIDAR DATA

FIELD

The following disclosure relates to navigation devices or services.

BACKGROUND

One of the biggest challenges in providing an accurate high definition (HD) map is mapping the entire roadway in a format that replicates the reality with utmost precision and accuracy. One key method is using Lidar (Light Detection and Ranging), and more specifically multi-return Lidar. Lidar uses a laser to measure distances from objects. The laser pulses reflect off of objects on and above the ground, which includes buildings, signs, trees, etc. Certain Lidar systems can collect multiple returns from the same laser pulse. Multiple returns allow for Lidar data to be used to separate the bare terrain from the surface features. Multi-return Lidar systems may be capable of recording up to five returns from each pulse allowing the Lidar system to capture much more data about the roadway environment. With each object the pulse hits a certain amount of the light is reflected back and detected and recorded by the sensor.

However, firms and companies struggle with collection of data using multi-return Lidar since this is dependent on specialized and expensive equipment. Multiple return Lidar can map the world in more efficient way since it has the ability to create heights of space/objects hidden behind obstructions. However, multi-return Lidar is a costly affair and is dependent heavily on physical collection by specialized expensive equipment.

SUMMARY

In an embodiment, a system is provided including a memory, a generative network, and a discriminator network. The memory is configured to store single return Lidar data and real multi-return Lidar data. The generative network is configured to input the single return Lidar data and generate synthetic multi-return Lidar data. The discriminator network is configured to distinguish the synthetic multi-return Lidar data from the real multi-return Lidar data. The generative network and discriminator network are iteratively trained using an adversarial approach where the generative network learns to generate more plausible synthetic multi-return Lidar data, while the discriminative network attempts to distinguish synthetic multi-return Lidar data produced by the generative network from the real multi-return Lidar data.

In an embodiment, a method is provided for training a generative network. The method includes: acquiring single return Lidar data and multi-return Lidar data; inputting the single return Lidar data into the generative network configured to output synthetic multi-return Lidar data; inputting, randomly, the multi-return Lidar data or the synthetic multi-return Lidar data into a discriminator network configured to attempt to classify the input as the multi-return Lidar data or the synthetic multi-return Lidar data; adjusting the generative network and the discriminative network based on the classification provided by the discriminator network; repeating inputting, inputting, and adjusting until convergence; and outputting a trained generative network.

In an embodiment, a method is provided for creating multi-return Lidar data from single return Lidar data. The method includes acquiring single return Lidar data for a location; inputting the single return Lidar data into a trained generative network configured using an adversarial process to generate synthetic multi-return Lidar data; outputting, by the trained generative network, synthetic multi-return Lidar data for the location; and updating a high-definition map with the synthetic multi-return Lidar data for the location.

BRIEF DESCRIPTION OF THE DRAWINGS

Exemplary embodiments of the present invention are described herein with reference to the following drawings.

DETAILED DESCRIPTION

Figure 1B:
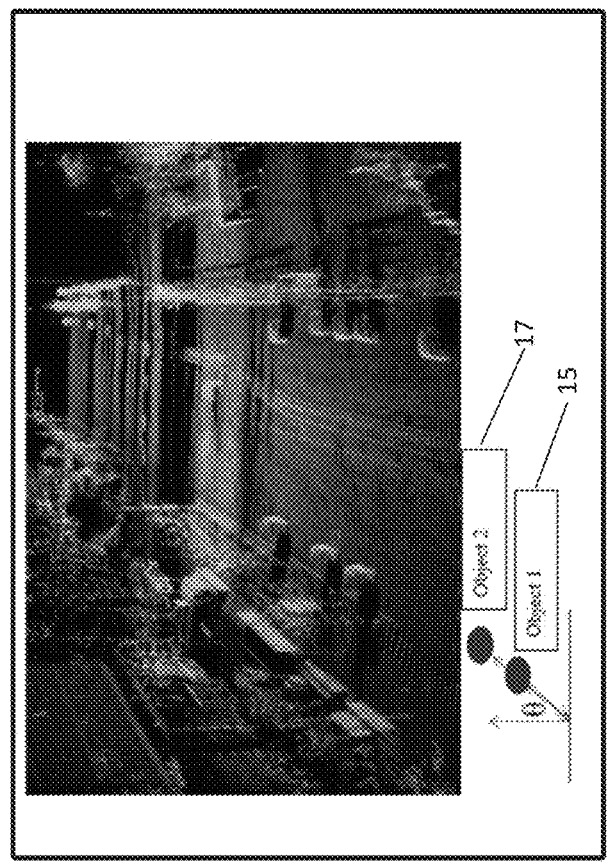
FIGS. 1A and 1B depict examples of single return and multi-return Lidar data respectively.

Embodiments provide a system and method that create multi-return map data using single return Lidar data. The method uses a long short-term memory (LSTM) model in combination with a Generative Adversarial Network (GAN) model. The systems and method use a single ($1^{st}$) return of Lidar at a time stamp and create multiple unseen samples of 2nd and 3rd returns. The LSTM model is used to create a sequential calibration based on incidence angle to choose the optimized 2nd and 3rd return at the same instance of the time stamp. This creates a localized model of three returns from a single return of Lidar and thus provides additional data to generate an HD map.

Modern vehicles require accurate navigational systems. A vehicle may eliminate many dangerous unknowns by identifying exactly where the vehicle is on the road in real time, along with its immediate surroundings. A high definition (HD) map is a crucial component of assisted or automatic driving technology. Vehicles may include many sensors, but a HD map may be the most important tool vehicles use. An HD map is needed not only to allow a vehicle to precisely position itself laterally and longitudinally, but to enable the car to maneuver correctly. While sensors in vehicles may detect out around 100 meters, a car traveling at 80 miles per hour only has a sensing horizon of three seconds. Vehicles need highly accurate and up to date maps to extend sensor range and "peek" around the corner.

Sensors in vehicles may be able to detect certain features and objects in real time using image processing and ranging based systems. These systems are useful for obstacle avoidance and detecting the movements of other vehicles. When used alone though, on-board sensor systems may exhibit large blind spots and may be unable to predict events or maneuvers even a short distance away. On-board sensors, however, when combined with HD maps may allow for assisted and highly automated vehicle operation. HD maps may allow a vehicle to identify precisely where it is with respect to the road (or the world) far beyond what the Global Positioning System (GPS) can do, and without inherent GPS errors. The HD map allows the vehicle to plan precisely where the vehicle may go, and to accurately execute the plan because the vehicle is following the map. By identifying precisely where a vehicle is on the road to the centimeter, and understanding the surroundings, a mapping system may bring advanced safety to an ever-changing environment.

One method of generating an HD map is to use a ranging based system such as Lidar. In a Lidar system, a laser device emits pulses (or beams) of light to determine the range to a distant target. The distance to the target is determined by precisely measuring the time delay between the emission of the pulse and the detection of the reflected (backscattered) signal. Characteristics of the reflecting objects that affect return intensity include the reflectivity of the material at the Lidar wavelength, how smooth or rough the surface is, and the orientation of the surface relative to the sensor. Highest return intensities are associated with smooth, highly reflective surfaces, such as bright building facades, that face the sensor (surface perpendicular to the direction of the laser beam). Darker surfaces absorb more of the laser energy while rougher surfaces scatter some of the energy away from the sensor, each resulting in lower return intensities. A smooth reflective surface may nevertheless produce lower intensity returns if it is tilted away from the direction of the incoming light pulse and thus reflects most of the energy away from the sensor.

An emitted laser pulse may return to the Lidar sensor as one or many returns. An emitted laser pulse that encounters multiple reflection surfaces as it travels toward a feature is split into as many returns as there are reflective surfaces. The first returned laser pulse is typically the most significant return and will be associated with the first feature in the landscape like roadside signs, vegetation, or parts of a building. Multiple returns and their intensities allow the system to detect multiple objects within the laser footprint of an outgoing laser pulse. As an example, the intermediate returns, in general, may be used for vegetation structure, and the last return for buildings or impassible walls.

Figure 1A:
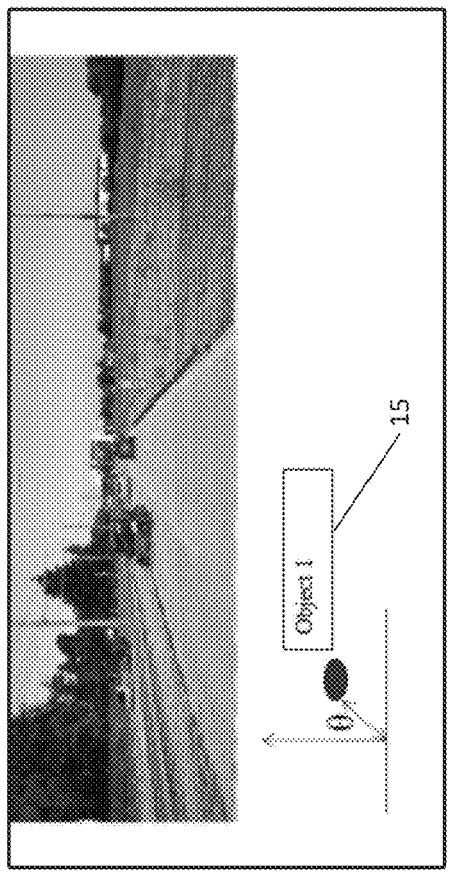
Figure 2:
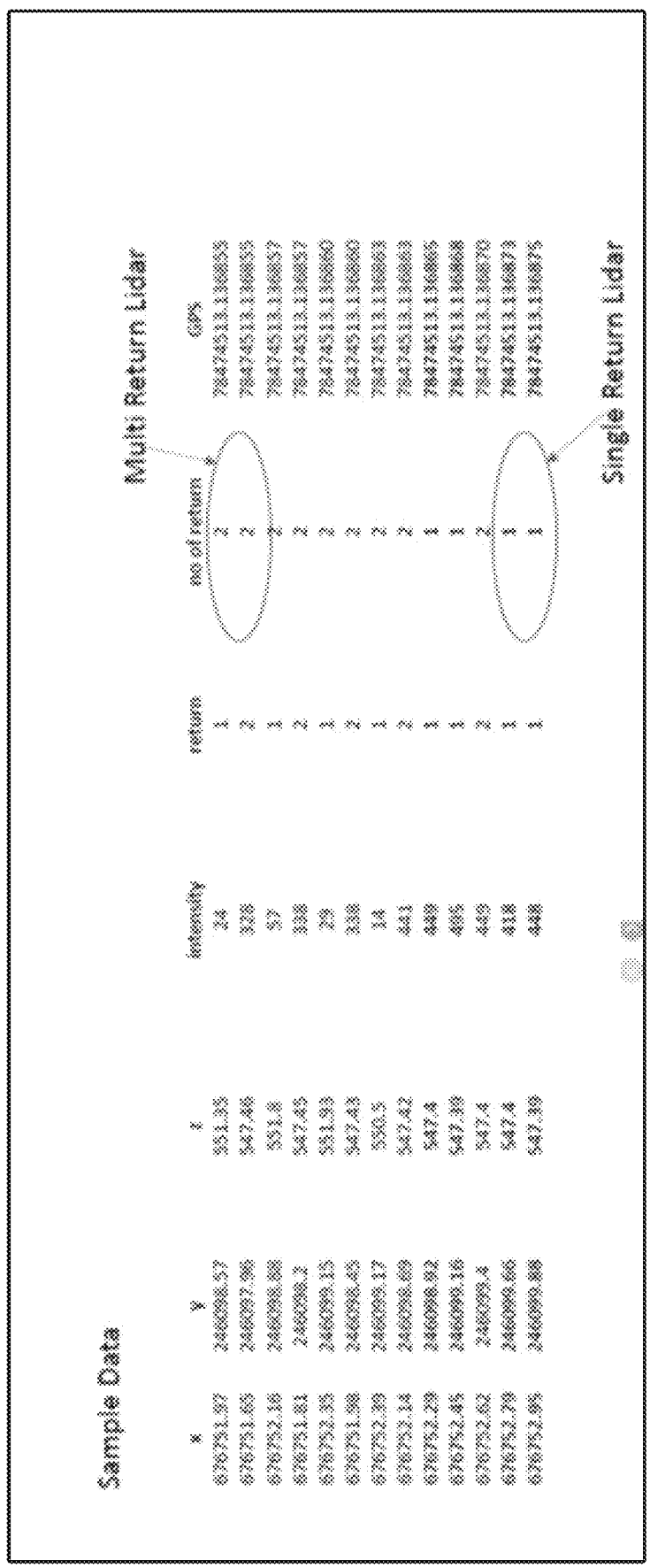
FIG. 2 depicts an example of Lidar data.

FIGS. 1A and 1B depicts an example of single return Lidar and multi-return Lidar. As shown in FIG. 1A, single return lidar captures a single data point for each pulse leaving the resulting 3D point cloud flat and lacking depth. In FIG. 1B, the multi-return Lidar data, on the other hand, is more complex and offers much more depth, for example, of the environment around the roadway such as occluded signs, buildings, vegetation, etc. For example, for the single lidar data, the HD map does not include or detect items or buildings behind the vegetation of parked vehicles. A Lidar system in FIG. 1A can detect one object 15, while a Lidar system in FIG. 1B can detect multiple objects behind one another 15, 17. Using, the multi-return data, however, allows the system to see additional objects and features of the roadway. FIG. 2 depicts an example of sample data returned by single return Lidar and multi-return Lidar devices. The sample data includes both the coordinates (x,y,z) of an object, intensity, GPS location of the device, and an indication of whether the data is from the $1^{st}$ or $2^{nd}$ return (where applicable).

Figure 3:
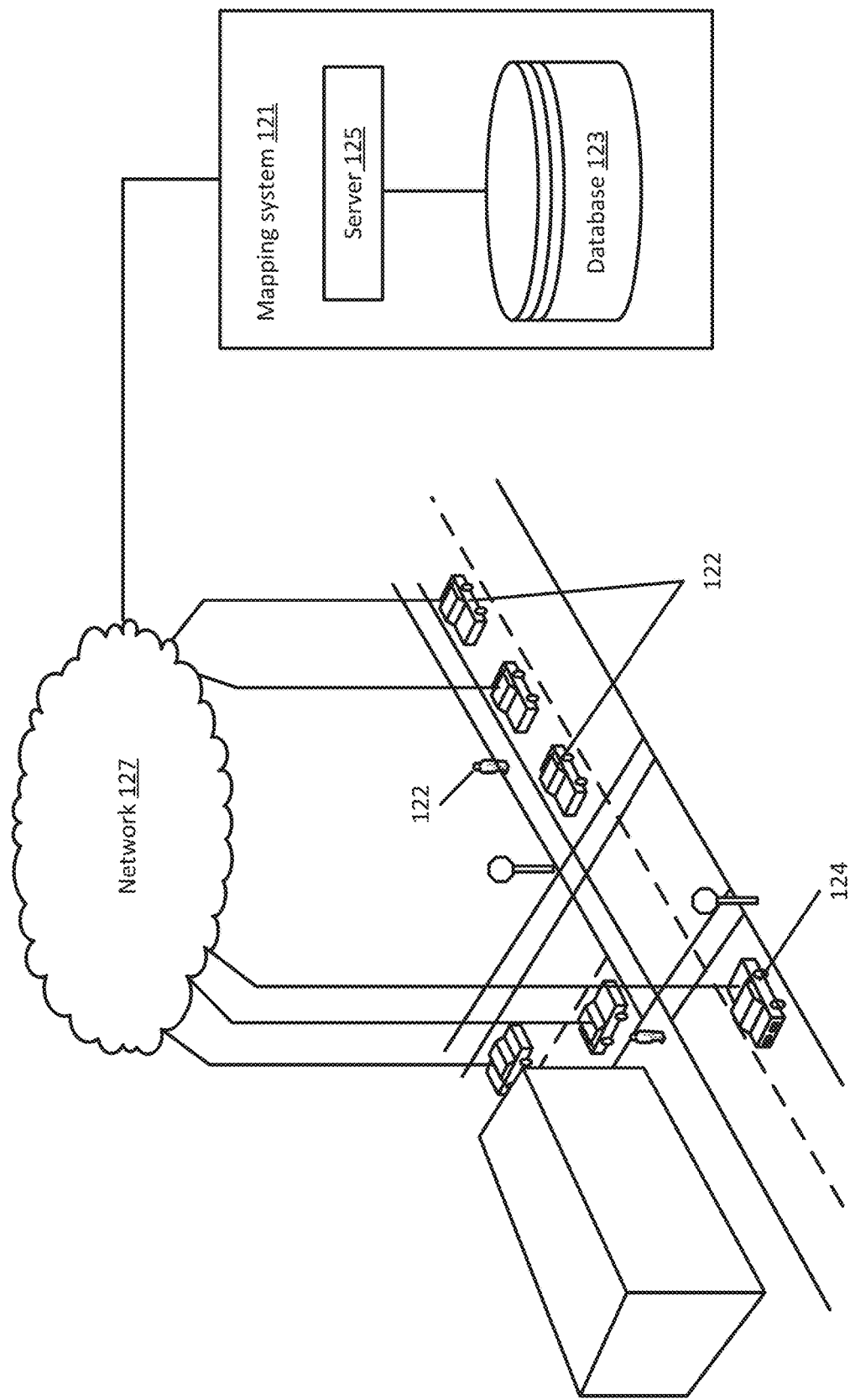
FIG. 3 depicts an example system for creating multi-return map data from single return lidar data according to an embodiment.

Embodiments provide systems and methods that convert or otherwise generate multi-return Lidar data from single return Lidar data. The synthetic multi-return Lidar data may be used to augment or improve HD maps. FIG. 3 depicts a system for creating multi-return Lidar data from single return Lidar data using a machine learning model. The system includes at least a vehicle 124, one or more devices 122, a network 127, and a mapping system 121. The mapping system 121 may include a database 123 (also referred to as a geographic database 123 or map database) and a server 125. Additional, different, or fewer components may be included. In an embodiment, the one or more devices 122 collect single return Lidar data which is stored in the geographic database 123. The single return Lidar data may be historical, e.g., collected over the past year, 5 years, 10 years etc., using single return Lidar devices/hardware. The mapping system 121 processes the single return Lidar data using a machine learning network referred to as a Seqli GAN. The Seqli Gan inputs the single return Lidar data and outputs multi-return Lidar data. The multi-return Lidar data may be used to augment, update, or otherwise maintain an HD map in the geographic database 123.

The one or more devices 122 may also include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle 124. The vehicle 124 may include one or more sensors or devices such as a Lidar device that captures data bout the roadway. A device 122 may transmit the data to the mapping system 121. Alternatively, the vehicle 124 may include the device 122 and may transmit the data to the mapping system 121 directly. The devices 122 may also include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire roadway data over a period of time. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The one or more devices 122 collect data related the roadway such as ranging data, image data, the location, feature data, and/or attributes. The roadway data may be collected over a period of time in different conditions. The devices 122 may be configured to provide probe reports to the mapping system 121 while traversing a roadway network. The probe reports may include sensor and feature data about the roadway. The probe reports may include road segment data that describes the shape, length, type, etc. of each link/roadway segment. Each vehicle 124 and/or mobile device 122 may include position circuitry such as one or more processors or circuits for generating probe data. The probe data may be generated by receiving Global Navigation Satellite System (GNSS) signals and comparing the GNSS signals to a clock to determine the absolute or relative position of the vehicle and/or mobile device 122. The probe data may be generated using embedded sensors or other data relating to the environment of a vehicle or device 122. The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The devices 122 and/or vehicle 124 includes one or more distance data detection devices or sensors, such as a Lidar or a Radar device. Radar sends out radio waves that detect objects and gauge their distance and speed in relation to the vehicle 124 in real time. Both short- and long-range radar sensors may be deployed all around the car and each one has their different functions. While short range (24 GHz) radar applications enable blind spot monitoring, for example lane-keeping assistance, and parking aids, the roles of the long range (77 GHz) radar sensors include automatic distance control and brake assistance. Unlike camera sensors, radar systems may still function properly when identifying objects during fog or rain. The vehicle 124 may also be equipped with Lidar. Lidar sensors work similar to radar systems, with the difference being that Lidar uses lasers instead of radio waves. As described above, the laser device emits pulses (or beams) of light to determine the range to a distant target. The distance to the target is determined by precisely measuring the time delay between the emission of the pulse and the detection of the reflected (backscattered) signal. Apart from measuring the distances to various objects on the road, the vehicle 124 may use Lidar to create three-dimensional images of the detected objects and map the surroundings. In an embodiment, the device 122/vehicle 124 may include or be in communication with a single return or a multi-return Lidar system. The multi-return Lidar system may be used to collect training data for the system. The single return system may acquire data that is input into the machine trained model that is upcycled into multi-return Lidar data for updating or augmenting an HD map. The vehicle 124 may also use Lidar to create a full 360-degree map around the vehicle 124 in real-time.

The device 122 and/or vehicle 124 may also use passive sensors, such as vision-based techniques with cameras or other imaging sensors to understand its position and provide information to the mapping system 121 to analyze and identify complex driving locations. Vision-based techniques are used to acquire information about signs, obstacles, other vehicles, and the geometry of the roadway and surrounding environment. Video data, image data, or other sensor data may be collected and processed to identify information about a particular location. The image data may be used by the mapping system 121 along with mapping data stored in the geographic database 123 to understand the location of the vehicle 124 and what driving decisions should be made.

During operation, the device 122 collects data as the device 122 traverses the roadway. The data may be used for immediate or real-time operation. The data may also be provided to the mapping system 121 in order to update, augment, or otherwise maintain an HD map that is stored in the geographic database. The data collected by the device 122, for example by a Lidar device, may include single return or multi-return Lidar data. For multi-return Lidar data, the mapping system 121 may directly use the data to update the HD map. The multi-return Lidar data may also be used to train a model as described below. For single return Lidar data, the mapping system 121 may use a model as described below to generate $2^{nd}$, $3^{rd}$, or more returns which then may be used to update the HD map.

The device 122 and/or vehicle 124 may include a communication device and an environment sensor array for detecting and reporting the surroundings of the vehicle 124 to the mapping system 121 in order to, for example, generate a three-dimensional map. The vehicle 124 may include an integrated communication device coupled with an in-dash navigation system. The vehicle 124 may include an ad-hoc communication device such as a mobile device or smartphone in communication with a vehicle system. The communication device connects the vehicle 124 to a network 127 including at least the mapping system 121.

The one or more devices 122 may communicate the roadway data to the server 125 or mapping system 121. To communicate with the devices 122, systems or services, the mapping system 121 is connected to the network 127. The mapping system 121 may receive or transmit data through the network 127. The mapping system 121 may also transmit paths, routes, or traffic accident/traffic violation data through the network 127. The mapping system 121 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The mapping system 121 may include multiple servers 125, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. In an embodiment, the data is single return Lidar data. The data may be historical, real-time, or predictive. The data may be stored in an HD map, in a location graph, or in the geographic database 123 for use in location-based services and navigation-based services. For the single return Lidar data, the data may be stored and later converted to multi-return Lidar data. The synthetic or generated multi-return Lidar data may be used to update, augment, or maintain the geographic database 123. The mapping service may also provide information generated the geographic database 123 such as a maintained HD map.

The geographic database 123 is configured to store and provide information to and from at least the mapping system 121, server 125, and devices 122. The geographic database 123 may store and organize the acquired Lidar data (single and multi-return) received from the devices 122 and/or processed (e.g., from single return Lidar data to multi-return Lidar data) by the mapping system 121. The geographic database 123 may include one or more indexes of geographic data. The indexes may include various types of indexes that relate the different types of data to each other or that relate to other aspects of the data contained in the geographic database 123. The indexes may include, for example, data relating to points of interest or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The geographic database 123 provides data (e.g., digital map data) for a model that is configured to transform single return Lidar data into synthetic multi-return Lidar data. The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway.

The server(s) 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may provide information generated from Lidar data included in the database 123. The server 125 may also provide historical, future, recent or current traffic conditions for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The server 125 may also be configured to provide up to date information and maps to external geographic databases or mapping applications.

The server 125 is configured to store a machine learning model that inputs single return Lidar data and returns multi-return Lidar data. The generated multi-return Lidar data may be used by the mapping system 121 to update or augment an HD map stored in the geographic database 123 and made available to devices 122 or vehicles 124.

Figure 4:
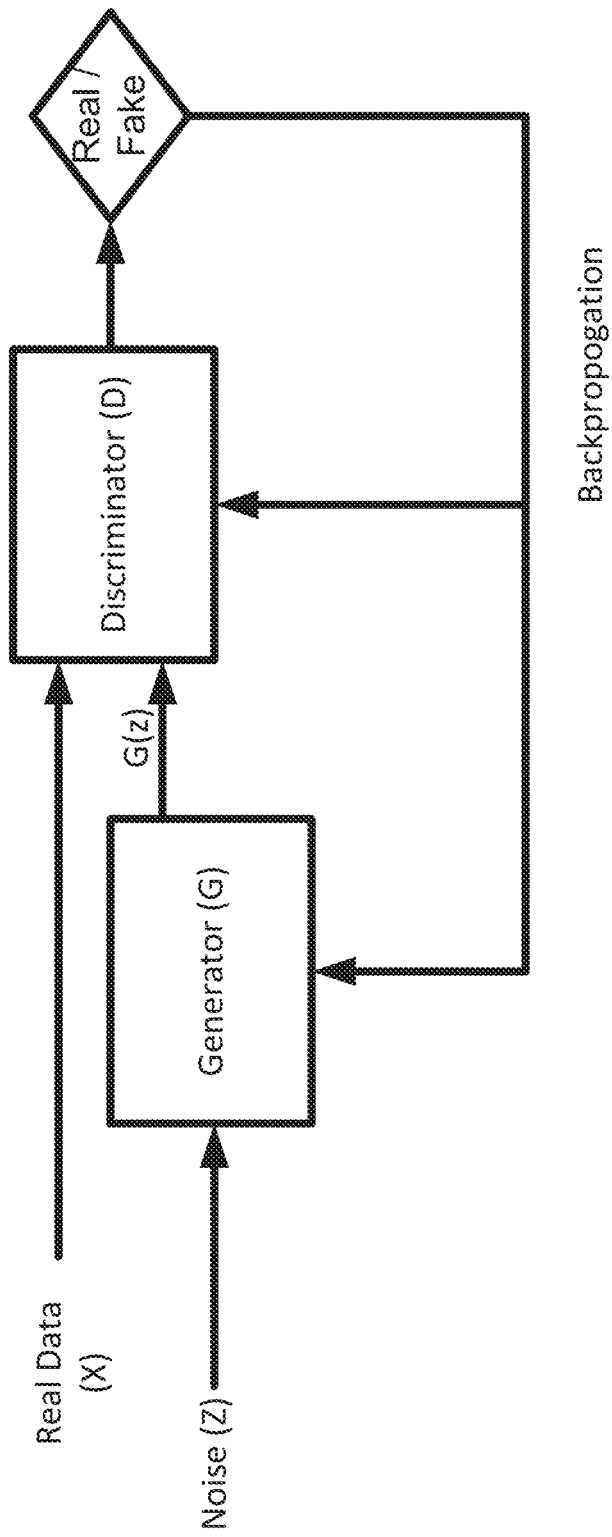
FIG. 4 depicts an example of a generative adversarial network.

The server 125 is configured to train or configure the machine learning model using training data acquired by the one or more devices 122/vehicles 124 and machine learning techniques. In an embodiment, the server 125 uses an adversarial model referred to as a generative adversarial network (GAN). The GAN model uses a minimax game to train a generation model from a game theory perspective. FIG. 4 depicts a structure of GAN. FIG. 4 includes two networks; one is the generator G. The goal of the generator G is to transform a noise variable z into the generated sample G(z), which learns the distribution of real data x. The other is the discriminator D, whose goal is to distinguish whether a sample is real or generated. In simple terms, G wants to deceive D and maximize the probability that D makes a mistake by generating high-quality samples, and D wants to make the best possible distinction between real samples x and generated samples G(z). The optimization of GAN is realized by finding the Nash equilibrium between G and D. In the process of network optimization, the generator G and the discriminator D are optimized in an alternating way. After many iterations, the entire network reaches an optimal balance. Through the competition of two networks, D achieves the best evaluation results, and G generates the data that learns the real distribution. GANs may typically be used to generate synthetic data such as image data. GANs, however, are not optimized for handling time-series or sequential data that includes data that includes time dependency. A GAN may be used to train a generator to maintain the fidelity of a real dataset. However, generating tabular data is far simpler than generating datasets that preserves temporal dynamics. To model successfully time-series data means that a model must, not only capture the datasets features distributions within each time-point but also, it should be able to capture the complex dynamics of those features across time.

Figure 5:
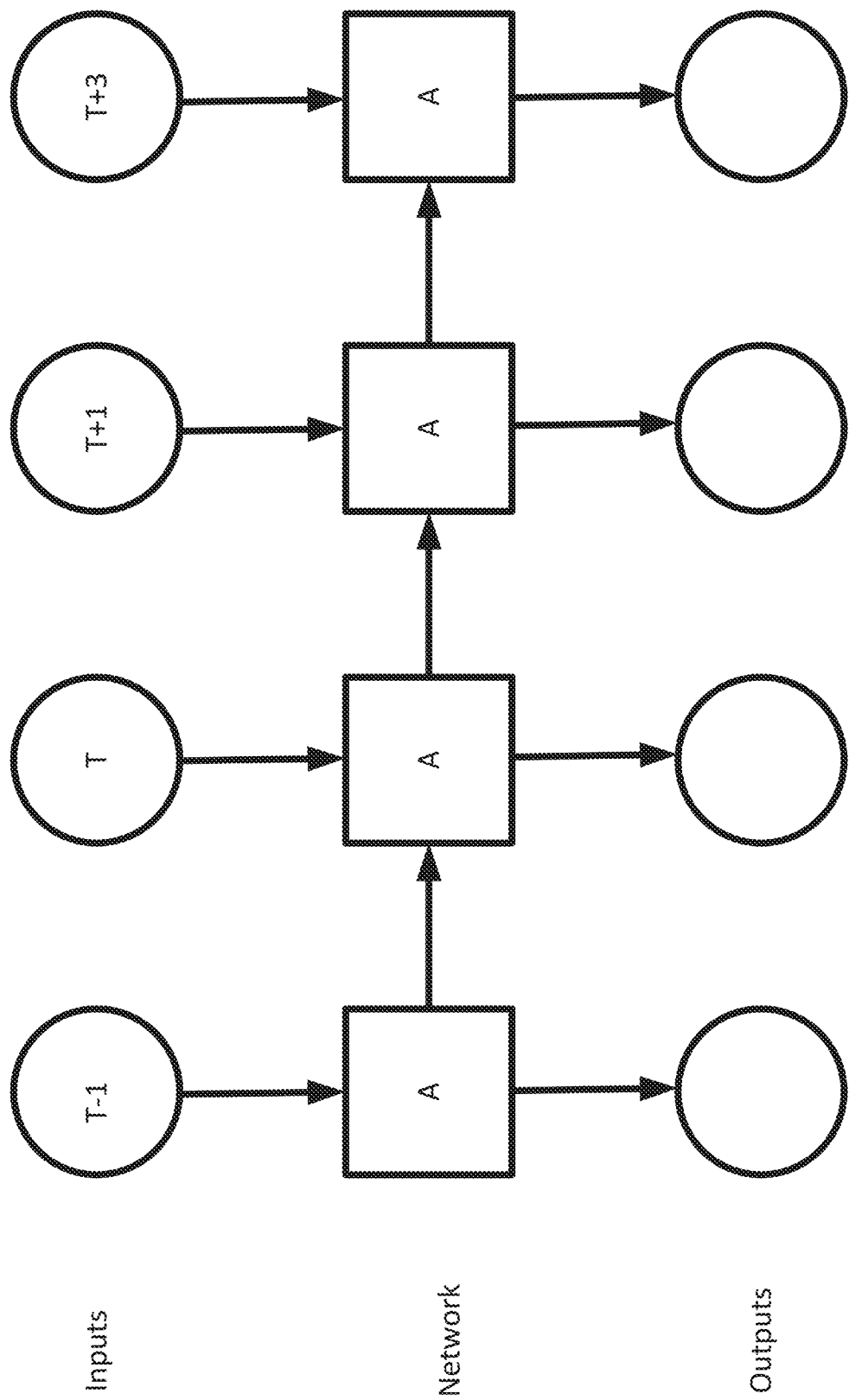
FIG. 5 depicts an example of an LSTM network.

One method for handling time-series or sequential data is to use an LSTM network. Long Short-Term Memory (LSTM) networks are a type of recurrent neural network capable of learning order dependence in sequence prediction problems. LSTM networks are commonly used in natural language processing as natural language processing includes sequential data. The meaning of a word or phrase depends on the use and the other words that precede and come after the word or phrase. FIG. 5 depicts a high-level diagram of how the LSTM units of a network work. In the diagram, part of the neural network, A, operates on some of the input and outputs a value. During this process, some information is held inside A to make the network "remember" this updated network. Network A is then applied to the next input where it predicts new output and its memory is updated. Information is thus carried over from T−1 to T to T+1 and so on. Each LSTM unit is typically composed of a cell, an input gate, an output gate and a forget gate. The cell remembers values over arbitrary time intervals and the three gates regulate the flow of information into and out of the cell. The input gate controls the flow of input activation into the memory cell. The output gate controls the output flow of cell activation into the rest of the network. The forget gate was to process continuous input streams that are not segmented into subsequences. LSTM may be implemented as unidirectional or bi-directional. In bidirectional long short-term memory, each training succession is introduced backwards and forward to isolate repetitive nets. The two groupings are associated with a similar yield layer. Bidirectional long short-term memory has total information about each point in a given arrangement, everything after and before it.

In an embodiment, the machine learning model is configured as a Seqli GAN that combines the generative capability of a GAN with the sequential memory of LSTM. The LSTM model handles time stamps of single return lidar to be fed into the GAN and the SVM splits the multiple intensity data for same time stamps. The trained machine learning model produces a synthetic output of multiple returns with single return Lidar. The trained machine learning model allows for easier collection and maintenance of an HD map as 1) previously collected single return data may be used without having to redrive the locations with multi-return devices and 2) devices that operate on the roadway may be able to acquire data with substantial lessor cost.

Figure 6:
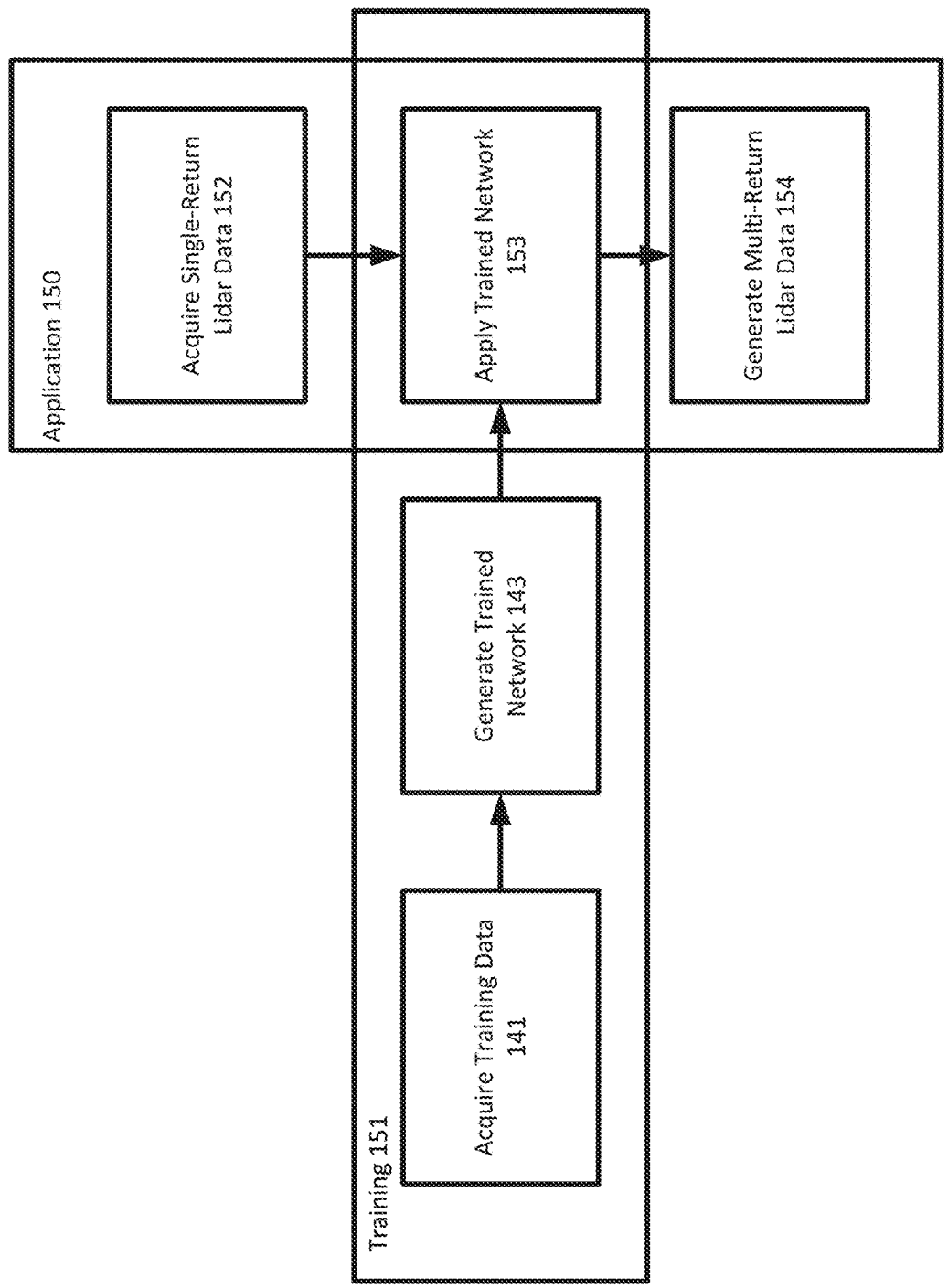
FIG. 6 depicts an example workflow for training and applying a network for creating multi-return map data from single return lidar data according to an embodiment.

FIG. 6 depicts an example flowchart for training and applying a model for transforming single return Lidar data into multi-return Lidar data. The flowchart includes two stages, a training stage 151 and an application stage 150. The training stage 151 includes acquiring 141 training data and inputting the training data into each network in order to generate 143 trained networks. The output of the training stage 151 is a trained network that is applied 153 in the application stage 150. The application stage 150 includes acquiring 152 single return Lidar data from either a device 122 or the geographic database 123, applying 153 the trained network that was trained during the training stage 151 to the single return Lidar data, and outputting 154 multi-return Lidar data. The multi-return Lidar data may be used to augment, update, or maintain a HD map.

The training stage 151 may be performed at any point prior to the application stage 150. The training stage 151 may be repeated after new training data is acquired. The application stage 150 may be performed at any point after the training stage 151 generates the trained network and single return Lidar data is acquired. The application stage 150 may be performed, for example, during (e.g., real time) or directly after a device 122 acquires single return Lidar data. Alternatively, the application stage 150 may be performed at a later point using data previously acquired and stored in the geographic database 123.

Figure 7:
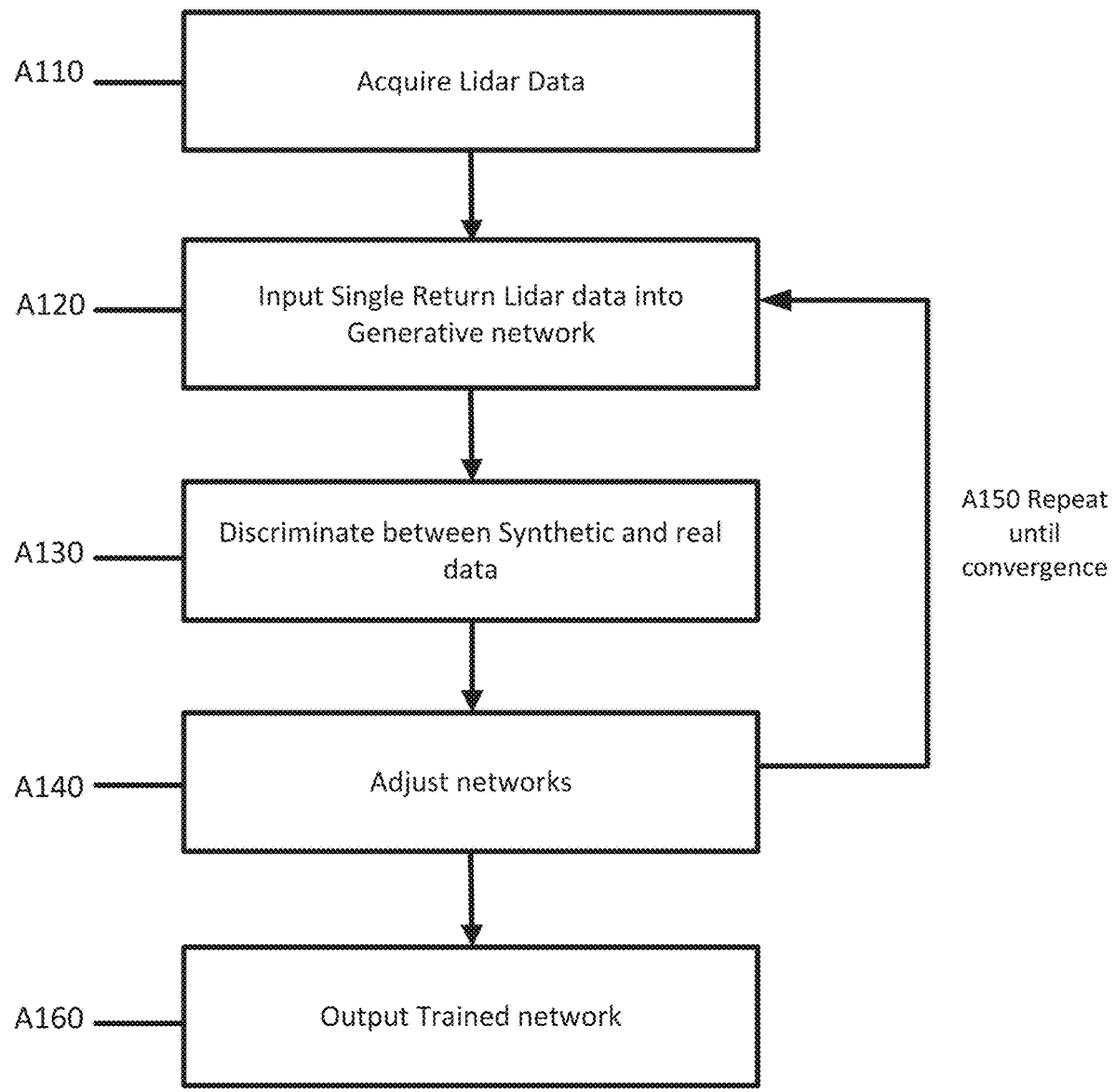
FIG. 7 depicts a workflow for training a network for creating multi-return map data from single return lidar data according to an embodiment.

FIG. 7 depicts a workflow for training 151 a model/network for generating multi-return Lidar data from single return Lidar data. As presented in the following sections, the acts may be performed using any combination of the components indicated in FIG. 3, 9, or 14. The following acts may be performed by the server 125, the device 122, the vehicle 124, the mapping system 121, or a combination thereof. Additional, different, or fewer acts may be provided. The acts are performed in the order shown or other orders. The acts may also be repeated. Certain acts may be skipped.

At act A110, the mapping system 121 acquires single return Lidar data and multi-return Lidar data. Lidar, also referred to as time of flight (ToF), laser scanners, or laser radar, is a sensing method that detects objects and maps their distances. Lidar works by illuminating a target with an optical pulse and measuring the characteristics of the reflected return signal. The width of the optical pulse can range from a few nanoseconds to several microseconds. Lidar systems may detect objects at distances ranging from a few meters to more than 200 m. Lidar allows for extremely high-resolution 3D characterization of objects in a scene without significant back-end processing. Different types of Lidar systems may be used such as solid state or mechanical devices. Mechanical Lidar uses high-grade optics and a rotating assembly to create a wide (for example, 360-degree) field of view (FOV). The mechanical aspect provides a high signal-to-noise ratio (SNR) over a wide FOV, but results in a bulky implementation. Solid-state Lidar does not include a spinning mechanical component and is much cheaper to implement. Solid-state Lidar uses multiple channels at the front, rear and sides of a vehicle and fuses the data to create a FOV that rivals mechanical Lidar.

As described above, Lidar systems may also be configured to collect multiple returns from the same laser pulse, for example, up to five returns from each laser pulse. For instance, one or more of the strongest, last, or dual return may be reported, depending on the laser return mode configurations. In single laser return mode (strongest return or last return), the sensor analyzes lights received from the laser beam to determine the distance and intensity information and subsequently employs this information to determine the last return or strongest return. Single return may be used for real-time applications where depth or detail may not be necessary outside the bounds of the roadway. In contrast, sensors in dual or multi-return configuration mode will return multiple measurements. Multi-return data may be best used when creating and maintaining detailed HD maps. Single return Lidar was also more popular in the past and thus prior collections of data may comprise primarily single return lidar data.

In an embodiment, a vehicle comprising a single return Lidar device is or was configured to acquire the single return Lidar data as the vehicle traversed a roadway. The single return Lidar data may be collected at any point and stored in the geographic database 123. In an embodiment, a vehicle including a multi-return Lidar device captures the multi-return lidar data which is used for training the model. In an embodiment, the real multi-return Lidar data comprises at least three levels of returns.

At act A120, the mapping system 121 inputs the single return Lidar data into a generative network configured to output synthetic multi-return Lidar data. In an embodiment, the generative network comprises a generator configured to generate 2nd and 3rd returns and a LSTM model configured to create a sequential calibration based on an incidence angle to select optimized 2nd and 3rd return for a time stamp. In an embodiment, the sequential calibration comprises a time, an intensity, and a derived distance. The returns and associated data (intensity, derived distance, and time) may be combined using a 4D matrix including the time, an incidence angle, an intensity, and a Euclidian distance (at t1). The data may then be compressed to a 2D value that is plotted against time creating a sequential or time series of data. The LSTM model outputs the optimized 2nd and 3rd return for a time stamp. In an embodiment, the generative network is configured to input noise with the single return Lidar data. The noise may be, for example, Gaussian noise. The output, e.g., the synthetic multi-return Lidar data, is then judged by the discriminator network.

At act A130, the mapping system 121 inputs, randomly, either the multi-return Lidar data or the synthetic multi-return Lidar data into a discriminator network configured to attempt to classy the input as the multi-return Lidar data or the synthetic multi-return Lidar data. The discriminator in a GAN may be configured as a classifier. The discriminator attempts to distinguish real data from the synthetic data created by the generator. The discriminator's training data uses real data instances, e.g., the real multi-return lidar data. The discriminator uses the real data instances as positive examples during training. The other source is the synthetic output created by the generator. The discriminator uses the synthetic instances as negative examples during training. In an embodiment, the discriminator network comprises a support vector machine. Support-vector machines are supervised learning models with associated learning algorithms that analyze data for classification.

At act A140, the mapping system 121 adjusts the generative network and the discriminative network based on the classification provided by the discriminator network, for example using backpropagation. During discriminator training, the discriminator classifies both real data and fake data from the generator. The discriminator loss penalizes the discriminator for misclassifying a real instance as fake or a fake instance as real. The discriminator updates its weights through backpropagation from the discriminator loss through the discriminator network. A generator loss penalizes the generator for producing a sample that the discriminator network classifies as fake. Both the generator and discriminator may be included in backpropagation. Backpropagation adjusts each weight in the right direction by calculating the weight's impact on the output. But the impact of a generator weight depends on the impact of the discriminator weights it feeds into. Backpropagation starts at the output and flows back through the discriminator into the generator. The generator may be trained using the following workflow: sample random noise, produce generator output from sampled random noise, get discriminator "Real" or "Fake" classification for generator output, calculate loss from discriminator classification, backpropagate through both the discriminator and generator to obtain gradients, and use the gradients to change only the generator weights. GAN training proceeds in alternating periods, the discriminator trains for one or more epochs, the generator trains for one or more epochs, and then the training is repeated to continue to train the generator and discriminator networks. At act A150, the mapping system 121 repeats inputting, inputting, and adjusting until convergence. As the generator improves with training, the discriminator performance gets worse because the discriminator can't easily tell the difference between real and fake. If the generator succeeds perfectly, then the discriminator has a 50% accuracy. In effect, the discriminator flips a coin to make its prediction.

At act A160, the mapping system 121 outputs a trained generative network. During operation, the single return Lidar data is previously collected data from the roadway. The synthetic multi-return Lidar data is used to generate a high-definition map without redriving the roadway.

Figure 8:
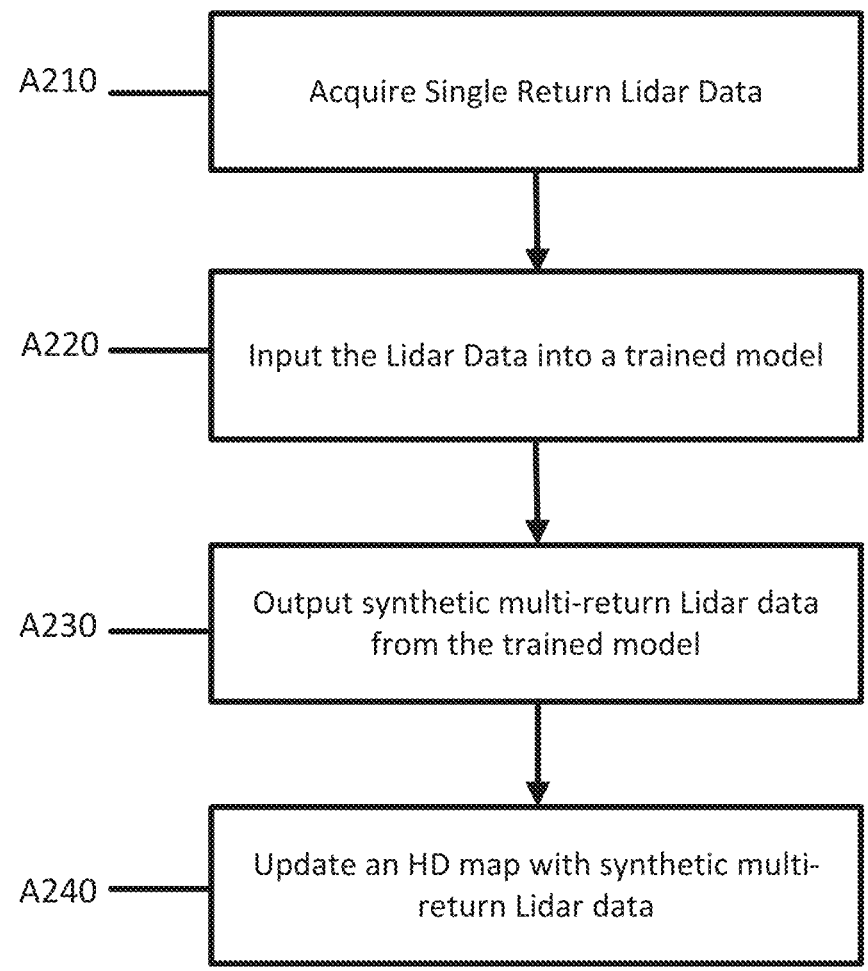
FIG. 8 depicts a workflow for applying a network for creating multi-return map data from single return lidar data according to an embodiment.

FIG. 8 depicts a workflow for applying 150 the model for generating multi-return Lidar data from single return Lidar data. As presented in the following sections, the acts may be performed using any combination of the components indicated in FIG. 3, 9, or 14. The following acts may be performed by the server 125, the device 122, the vehicle 124, the mapping system 121, or a combination thereof. Additional, different, or fewer acts may be provided. The acts are performed in the order shown or other orders. The acts may also be repeated. Certain acts may be skipped.

At act A210, single return Lidar data is acquired. Certain systems may identify only a single return. Many modern systems, however, may identify multiple returns (e.g., up to five) from a single beam. The single return Lidar data may thus be historical or collected at an earlier time, for example several years ago. The single return lidar data may also be collected recently or in real time. The single return Lidar data may be stored in the geographic database 123.

At act A220, the single return Lidar data is input into a trained model. The model is trained using an adversarial process between a generator and a discriminator. The model also may be configured to use LSTM units in order to select the optimized returns in light of the sequential nature of multi-return data.

At act A230, synthetic multi-return Lidar data is output. The synthetic multi-return lidar data may include at least a $1^{st}$ return (from the single return data), a $2^{nd}$ return, and a $3^{rd}$ return, including at least the intensity and distance values.

At act A240, a HD map is updated with the synthetic multi-return Lidar data. The HD map may be stored in the geographic database 123. The HD map may be provided to devices 122 or vehicles 124 that are traversing the roadway.

Figure 9:
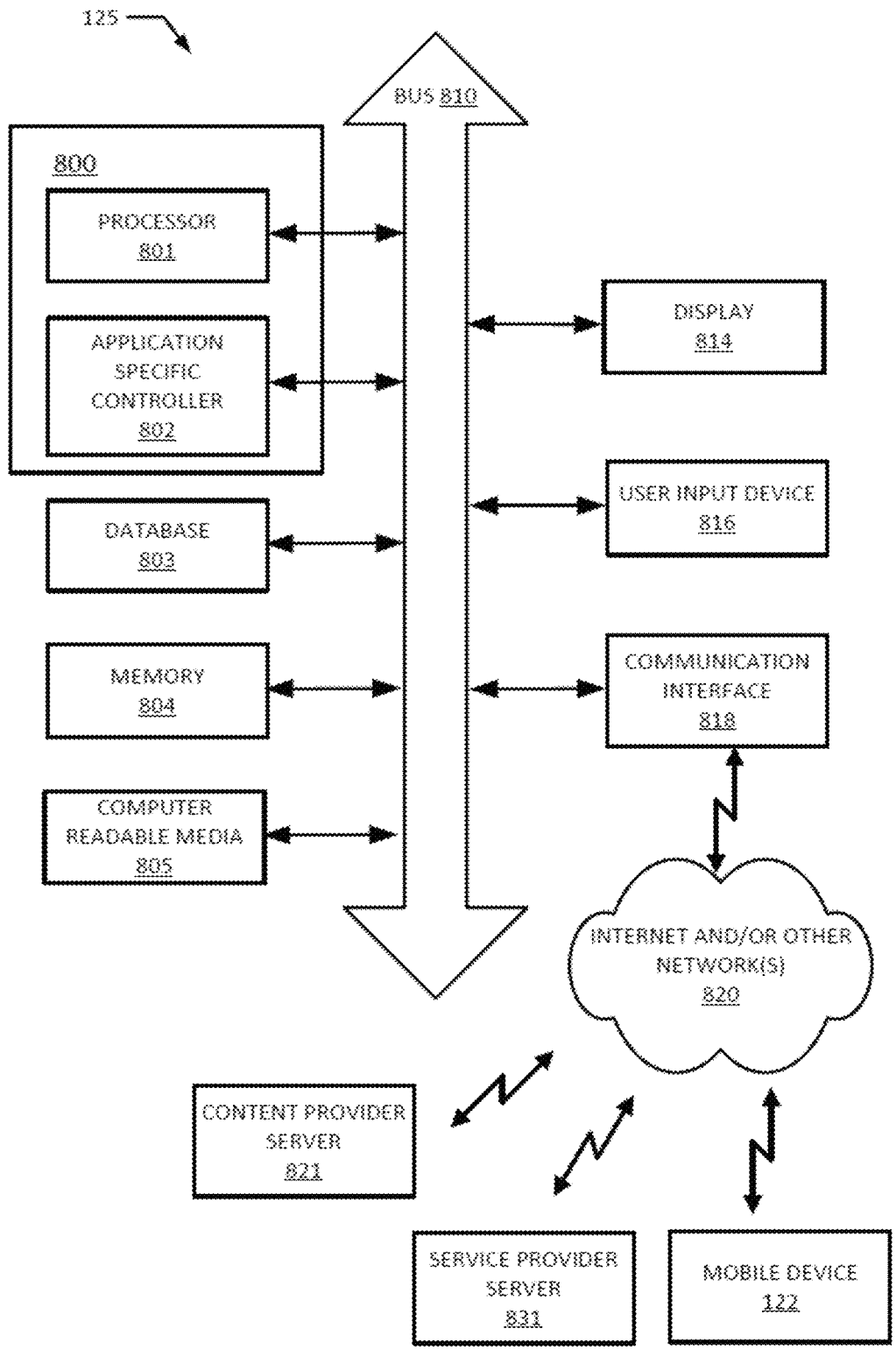
FIG. 9 depicts an example server of FIG. 3.

FIG. 9 illustrates an example server 125 for the system of FIG. 3 that is configured to train and implement a machine trained model configured to transform single return Lidar data into multi-return Lidar data. The server 125 may include a bus 810 that facilitates communication between a controller that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to the geographic database 123. The server-side database 803 may be a master database that provides data in portions to a database of the mobile device 122. Additional, different, or fewer components may be included.

The server 125 may store one or more models in the memory 804. The models may be configured or trained using an adversarial process to transform single return Lidar data into multi-return Lidar data. In an embodiment, the models may be configured as a Seqli GAN. The model(s) may include a neural network that is defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

Alternative neural network configurations and workflows may be used for the network such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of a feature map. The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

The training data for the model/network (and other networks) includes ground truth data or gold standard data, for example real multi-return Lidar data. Ground truth data and gold standard data is data that includes correct or reasonably accurate labels that are verified manually or by some other accurate method. The training data may be acquired at any point prior to inputting the training data into the network. In an example operation, the model is configured as classifiers. The network inputs the training data (single return data and/or noise) and outputs $2^{nd}$, $3^{rd}$, $4^{th}$, $5^{th}$, etc. for every return, intensity and derived distance, and time. The prediction is compared to the annotations from the training data. A loss function may be used to identify the errors from the comparison. The loss function serves as a measurement of how far the current set of predictions are from the corresponding true values. Some examples of loss functions that may be used include Mean-Squared-Error, Root-Mean-Squared-Error, and Cross-entropy loss. Mean Squared Error loss, or MSE for short, is calculated as the average of the squared differences between the predicted and actual values. Root-Mean Squared Error is similarly calculated as the average of the root squared differences between the predicted and actual values. For cross-entropy loss each predicted probability is compared to the actual class output value (0 or 1) and a score is calculated that penalizes the probability based on the distance from the expected value. The penalty may be logarithmic, offering a small score for small differences (0.1 or 0.2) and enormous score for a large difference (0.9 or 1.0). During training and over repeated iterations, the network attempts to minimize the loss function as the result of a lower error between the actual and the predicted values means the network has done a good job in learning. Different optimization algorithms may be used to minimize the loss function, such as, for example, gradient descent, Stochastic gradient descent, Batch gradient descent, Mini-Batch gradient descent, among others. The process of inputting, outputting, comparing, and adjusting is repeated for a predetermined number of iterations with the goal of minimizing the loss function. Once adjusted and trained, the model is configured to output synthetic multi-return lidar data when input single return lidar data.

The server 125 is configured to transform historical or real-time single return Lidar data into multi-return Lidar data that is used to update, augment, or otherwise maintain a HD map stored in the geographic database 123. The server 125 may be in communication through the network 127/820 with a content provider server 821 and/or a service provider server 831. The server 125 may provide mapping data, for example the HD map data, to the content provider server 821 and/or the service provider server 831. The content provider may include device manufacturers that provide location-based services that users may access.

The server 125 includes a memory/database 803 that is configured to store digital mapping data. The database 803 may be or may include a copy of the geographic database 123. The geographic database 123 is configured to store digital mapping data for locations such as the single return Lidar data and the multi-return Lidar data. The one or more devices 122 may collect data and transmit the data to the mapping system 121. The collected data may be stored with or cross checked with data stored in the geographic database 123. The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes. The geographic data may additionally or alternatively include other data records such as, for example, POI data records, topographical data records, cartographic data records, routing data, and maneuver data.

Figure 10:
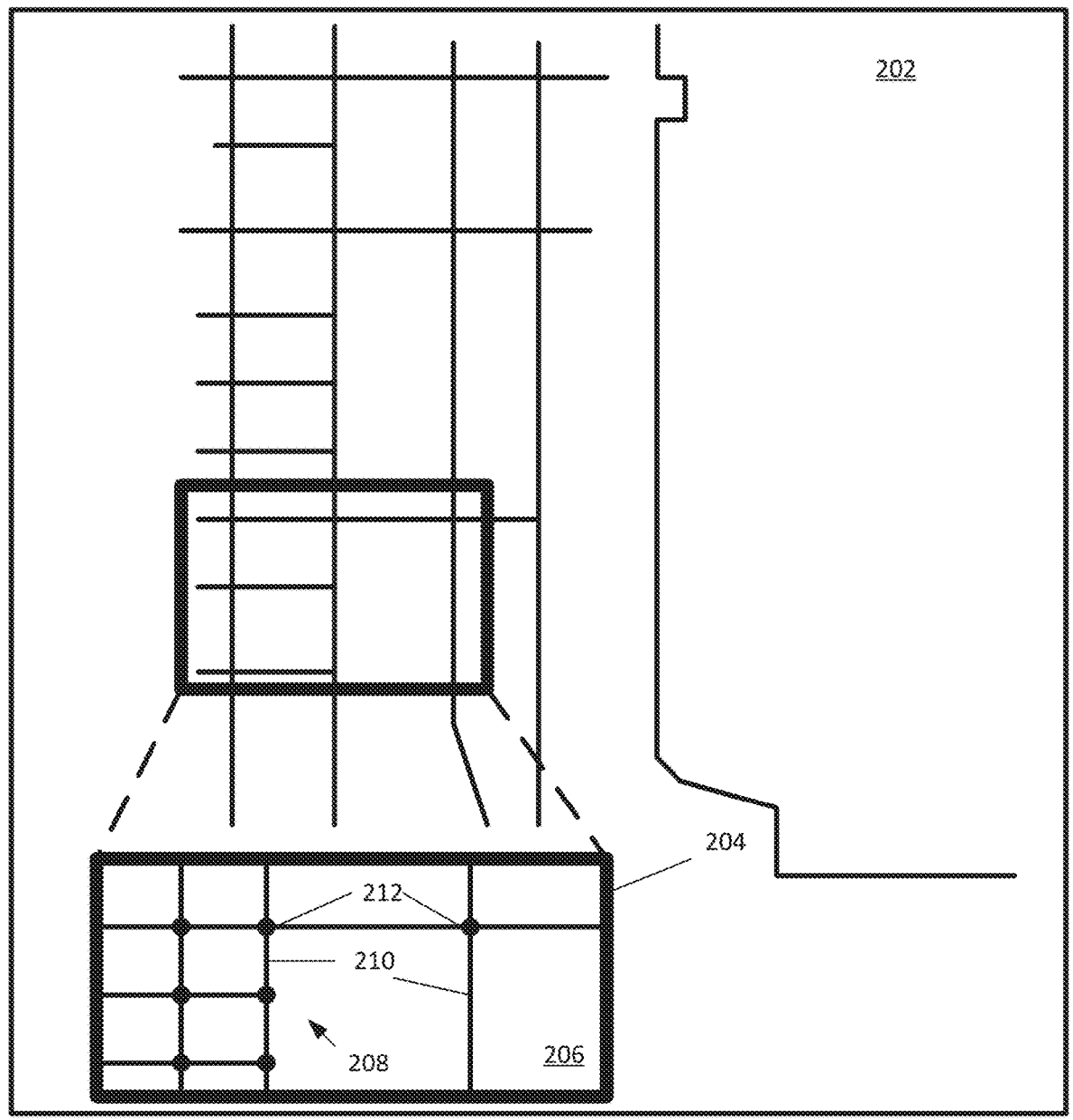
FIG. 10 depicts an example two-dimensional map.

FIG. 10 illustrates a 2D map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc. FIG. 10 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 11:
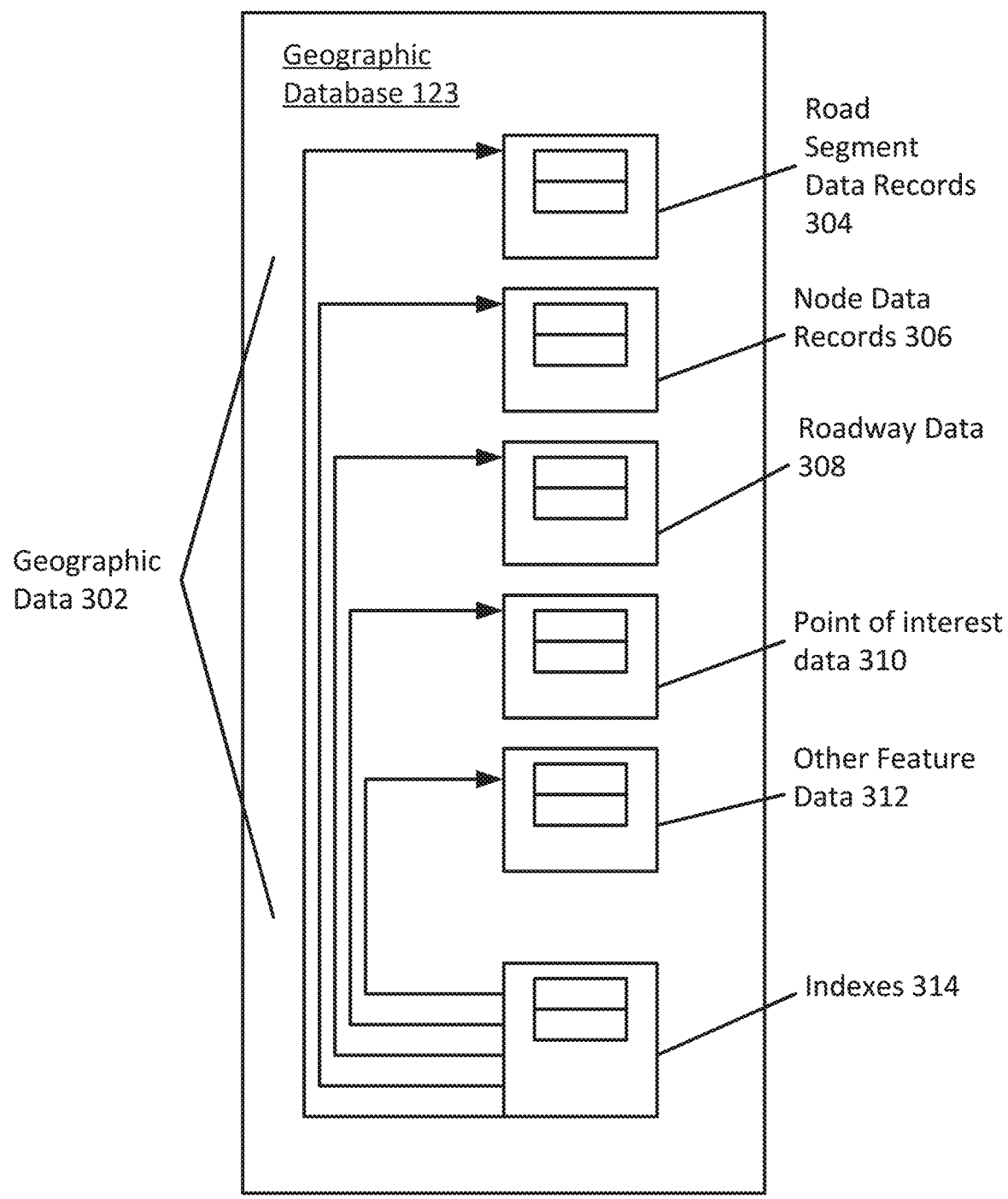
FIG. 11 depicts an example of the geographic database of FIG. 3.

As depicted in FIG. 11, in one embodiment, the geographic database 123 contains geographic data 302 that represents some of the geographic features in the geographic region 202 depicted in FIG. 11. The data 302 contained in the geographic database 123 may include data that represent the road network 208. In FIG. 11, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The complex driving data 310 may include data or sub-indices or layers for different types of scenarios. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 12:
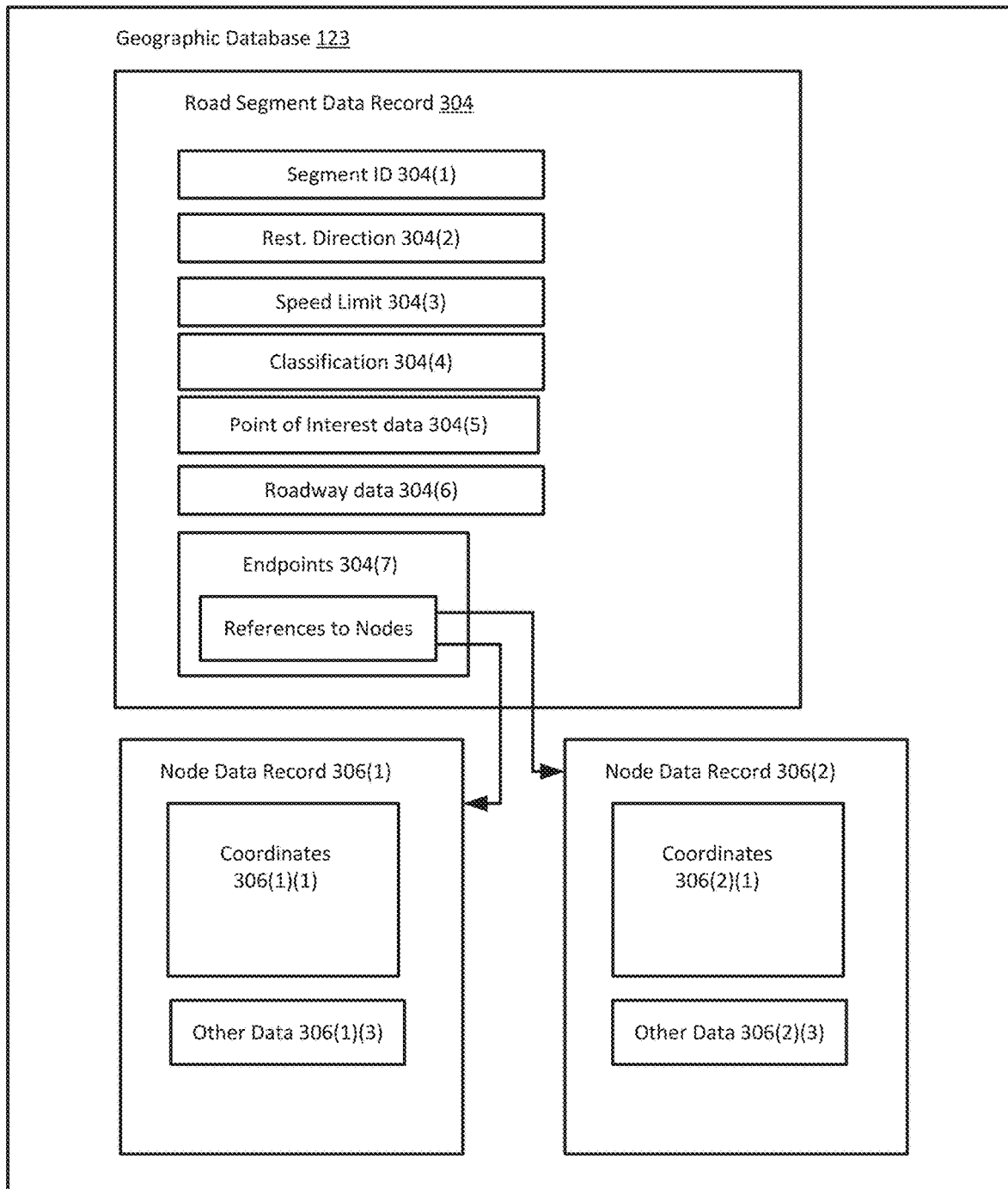
FIG. 12 depicts an example of the structure of the geographic database of FIG. 3.

FIG. 12 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record, or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 12 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 12, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes. The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

The memory 804 and/or the computer readable medium 805 may also include a set of instructions that can be executed to cause the server 125 to perform any one or more of the methods or computer-based functions disclosed herein. In a networked deployment, the system of FIG. 9 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

Figure 13:
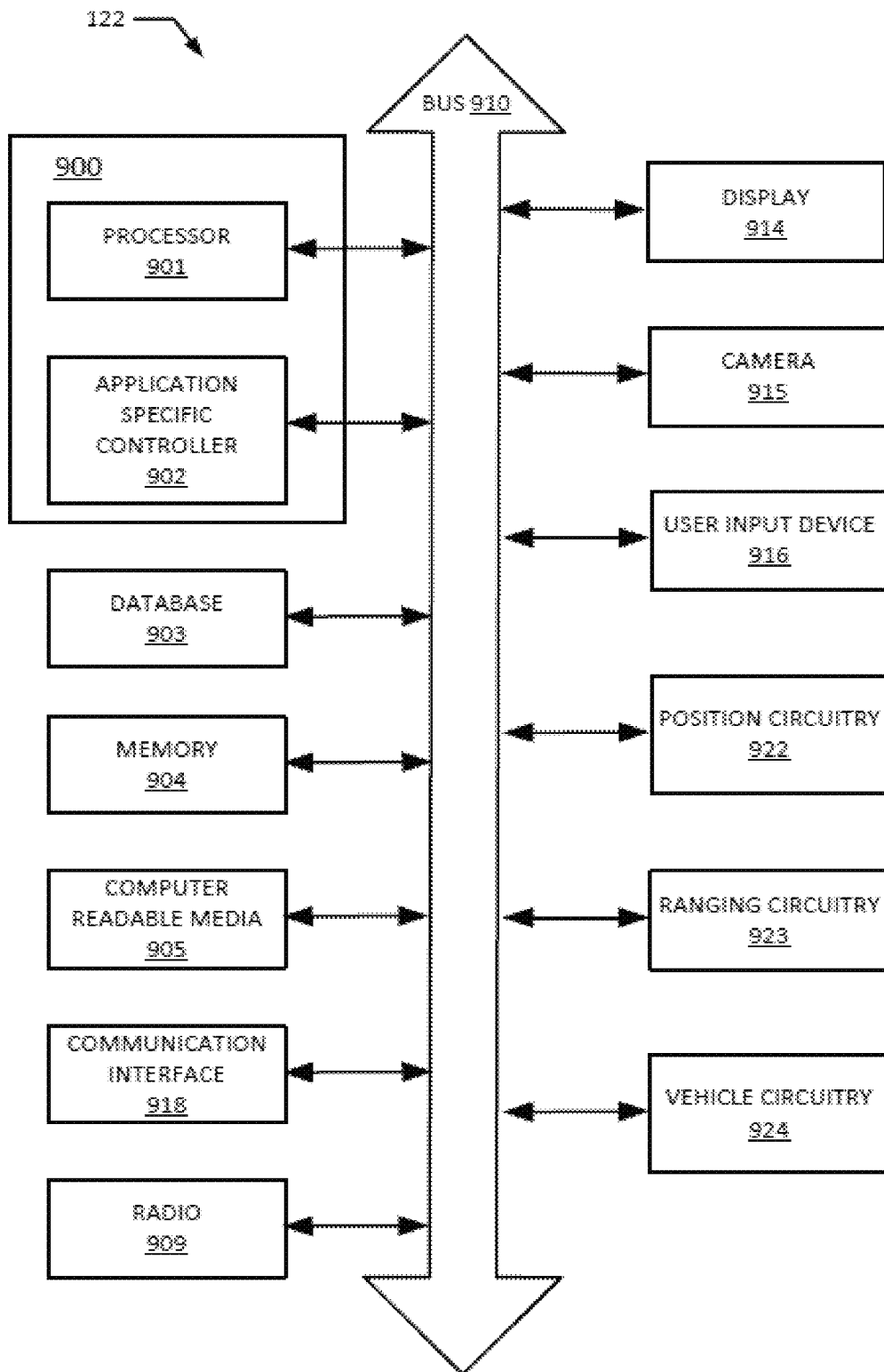
FIG. 13 depicts an example device of FIG. 3.

FIG. 13 illustrates an example mobile device 122 for the system of FIG. 3 that is configured to acquire lidar data and/or make use of an HD map. The mobile device 122 may include a bus 910 that facilitates communication between a controller 900 that may be implemented by a processor 901 and/or an application specific controller 902, that may be referred to individually or collectively as controller 900, and one or more other components including a database 903, a memory 904, a computer readable medium 905, a communication interface 918, a radio 909, a display 914, a camera 915, a user input device 916, position circuitry 922, and ranging circuitry 923. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 3). Additional, different, or fewer components may be included.

The device 122 is configured to acquire data for updating, augmenting, or otherwise maintaining an HD map. The device 122 is also configured to determine its position using the positioning circuitry 922, generate a report or request using the controller 900, and transmit the report to a mapping system 121 using the communication interface 918. The device 122 may also be configured to acquire and view data from a geographic database 123. In real-time, the device 122 may be embedded in a vehicle 124 and may be configured to acquire sensor data (e.g., Lidar data) for a location, generate a report, and transmit the report to the mapping system 121. The device is configured to receive HD map data and generate an instruction for the vehicle 124 to perform an action.

The device 122 is configured to use the ranging circuitry 923 and/or camera and/or position circuitry 922 to acquire sensor data. The ranging circuitry 923 may include a Lidar system, a RADAR system, a structured light camera system, SONAR, or any device configured to detect the range or distance to objects from the mobile device 122. The ranging circuitry may also include cameras at different angles and may be capable of maintaining a 360° view of its external environment. The device 122 may utilize 3D cameras for displaying highly detailed and realistic images. These image sensors automatically detect objects, classify them, and determine the distances between them and the device 122. For example, the cameras may identify other cars, pedestrians, cyclists, traffic signs and signals, road markings, bridges, and guardrails.

The controller 900 may also include a routing module including an application specific module or processor that calculates routing between an origin and destination. The routing module is an example means for generating a route. The display 914 is an example means for displaying the routing command. The mobile device 122 may generate a routing instruction based on the anonymized data. The routing instructions may be provided by the display 914. The mobile device 122 may be configured to execute routing algorithms to determine an optimum route to travel along a road network from an origin location to a destination location in a geographic region. Using input(s) including map matching values from the mapping system 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments. The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 904 may be a volatile memory or a non-volatile memory. The memory 904 may include one or more of a read-only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

Figure 14:
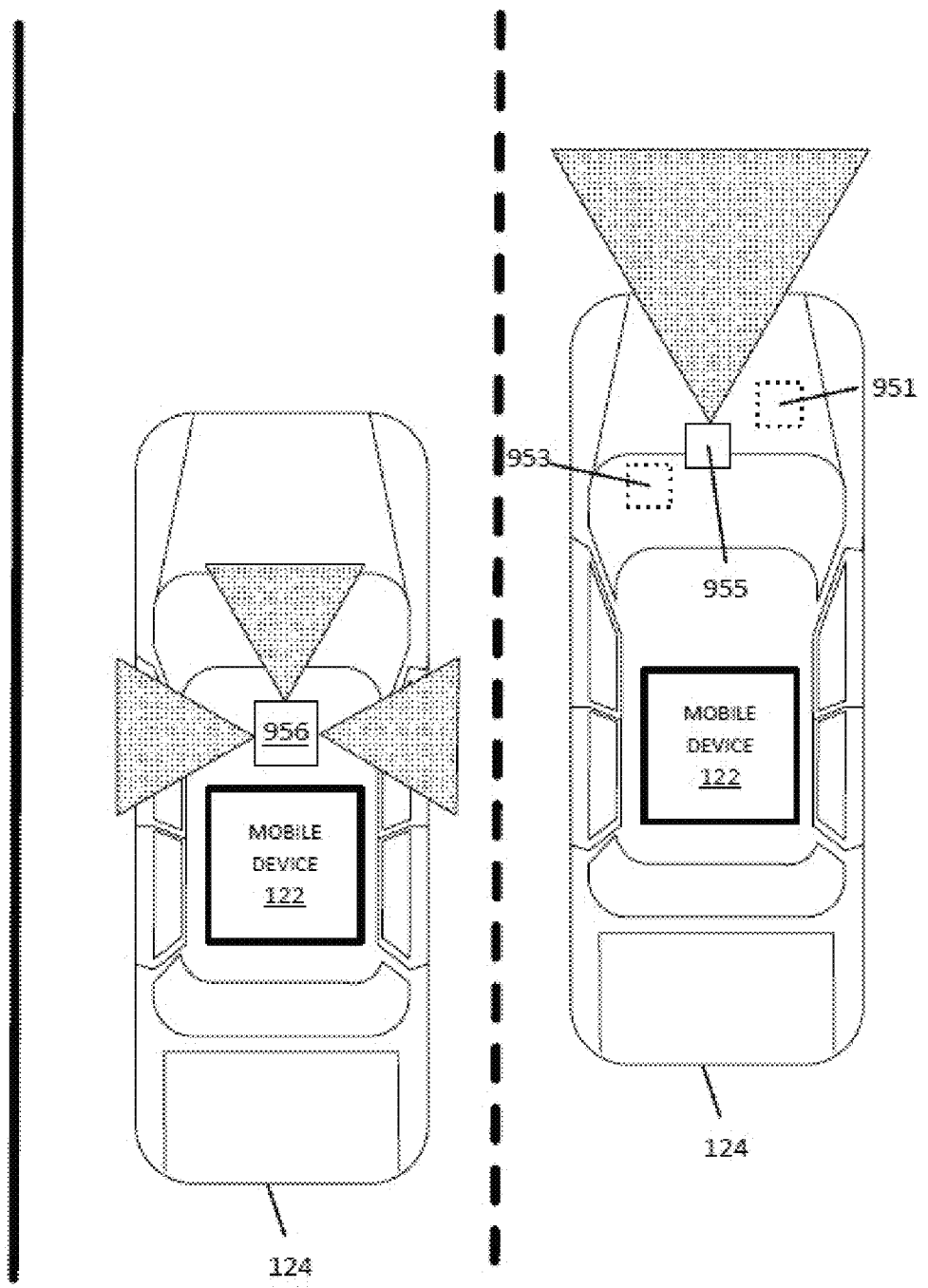
FIG. 14 depicts example autonomous vehicles of FIG. 3.

FIG. 14 illustrates exemplary autonomous vehicles 124 for providing location-based services or application using the systems and methods described herein as well as collecting data for such services or applications described herein. The autonomous vehicles 124 may include a variety of devices that collect position data as well as other related sensor data for the surroundings of the autonomous vehicle 124, here depicted as a car, but which use and configuration may be applied to bikesharing, scootersharing, or other autonomous vehicles 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a Lidar device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the autonomous vehicle 124 to the mapping system 121. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and the mapping system 121. The network may be the Internet or connected to the internet.

The sensor array may include one or more sensors configured to detect surroundings of the autonomous vehicle 124. The sensor array may include multiple sensors. Example sensors include an optical distance system such as Lidar 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the autonomous vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

The device 122 may be integrated in the autonomous vehicle 124, which may include assisted driving vehicles such as autonomous vehicles 124, highly assisted driving (HAD), and advanced driving assistance systems (ADAS). Any of these assisted driving systems may be incorporated into mobile device 122. Alternatively, an assisted driving device may be included in the autonomous vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the mapping system 121 and driving commands or navigation commands. The device 122/vehicle 124 is configured to receive data from the mapping system 121 and perform an action such as adjusting the speed of a vehicle, making a turn, adjusting a lane position, changing lanes, etc.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A system comprising:
   a memory configured to store single return Lidar data and real multi-return Lidar data;
   a generative network configured to input the single return Lidar data and generate synthetic multi-return Lidar data; and
   a discriminator network configured to distinguish the synthetic multi-return Lidar data from the real multi-return Lidar data;
   wherein the generative network and discriminator network are iteratively trained using an adversarial approach where the generative network learns to generate more plausible synthetic multi-return Lidar data, while the discriminative network attempts to distinguish synthetic multi-return Lidar data produced by the generative network from the real multi-return Lidar data.

2. The system of claim 1, wherein the real multi-return Lidar data comprises at least three levels of returns.

3. The system of claim 1, wherein the generative network comprises a generator configured to generate 2nd and 3rd returns and a LSTM model configured to create a sequential calibration to select optimized 2nd and 3rd return for a time stamp.

4. The system of claim 3, wherein the sequential calibration comprises a time, an intensity, and a derived distance.

5. The system of claim 1, wherein the generative network is further configured to input noise with the single return Lidar data.

6. The system of claim 1, wherein the discriminator network comprises a support vector machine.

7. The system of claim 1, further comprising:
   a vehicle comprising a single return Lidar device configured to acquire the single return Lidar data as the vehicle traverses a roadway.

8. The system of claim 7, wherein the single return Lidar data is previously collected data from the roadway, wherein the synthetic multi-return Lidar data is used to generate a high-definition map without redriving the roadway.

9. The system of claim 1, wherein the single return Lidar data comprises data for a location on a roadway for which real multi-return Lidar data is not stored in the memory.

10. A method for training a generative network, the method comprising:
- acquiring single return Lidar data and multi-return Lidar data;
- inputting the single return Lidar data into the generative network configured to output synthetic multi-return Lidar data;
- inputting, randomly, the multi-return Lidar data or the synthetic multi-return Lidar data into a discriminator network configured to attempt to classify the input as the multi-return Lidar data or the synthetic multi-return Lidar data;
- adjusting the generative network and the discriminative network based on the classification provided by the discriminator network;
- repeating inputting, inputting, and adjusting until convergence; and
- outputting a trained generative network.

11. The method of claim 10, wherein the synthetic multi-return Lidar data comprises at least three levels of returns.

12. The method of claim 10, wherein the generative network comprises a generator configured to generate 2nd and 3rd returns and a LSTM model configured to create a sequential calibration to select optimized 2nd and 3rd return for a time stamp.

13. The method of claim 10, wherein the generative network is further configured to input noise with the single return Lidar data.

14. The method of claim 10, wherein the single return lidar data is acquired by a vehicle including at least a single return Lidar device as the vehicle traverses a roadway.

15. A method for creating multi-return Lidar data from single return Lidar data, the method comprising:
- acquiring single return Lidar data for a location;
- inputting the single return Lidar data into a trained generative network configured using an adversarial process to generate synthetic multi-return Lidar data;
- outputting, by the trained generative network, synthetic multi-return Lidar data for the location; and
- updating a high-definition map with the synthetic multi-return Lidar data for the location.

16. The method of claim 15, wherein the synthetic multi-return Lidar data comprises at least three levels of returns.

17. The method of claim 15, wherein the single return lidar data is acquired by a vehicle including at least a single return Lidar device as the vehicle traverses the location.

18. The method of claim 15, further comprising:
- providing the high-definition map to one or more vehicles.

19. The method of claim 15, wherein the generative network comprises a generator configured to generate 2nd and 3rd return data and a LSTM model configured to create a sequential calibration to select optimized 2nd and 3rd return data for a respective time stamp.

20. The method of claim 15, wherein the single return Lidar data is acquired from a geographic database.

* * * * *